(12) United States Patent
Junga et al.

(10) Patent No.: US 7,004,275 B1
(45) Date of Patent: Feb. 28, 2006

(54) MOVABLE OPERATOR STATION FOR VEHICLES

(75) Inventors: Christopher L. Junga, Carlisle, PA (US); Chad L. Fluent, St. Thomas, PA (US); Richard Eugene Whitfield, Evans, GA (US)

(73) Assignee: Ingersoll-Rand Company, Montvale, NJ (US)

( * ) Notice: Subject to any disclaimer, the term of this patent is extended or adjusted under 35 U.S.C. 154(b) by 0 days.

(21) Appl. No.: 10/918,001

(22) Filed: Aug. 13, 2004

(51) Int. Cl.
   *B62D 33/06* (2006.01)
   *E01C 19/23* (2006.01)
(52) U.S. Cl. .................... 180/89.13; 180/327; 404/122
(58) Field of Classification Search ................ 404/117, 404/122, 132; 180/326, 327, 89.13, 89.14; 296/190.05
See application file for complete search history.

(56) References Cited

U.S. PATENT DOCUMENTS

| 3,229,602 A | 1/1966 | Vivier |
| 3,901,617 A | 8/1975 | Herbst |
| 3,947,142 A | 3/1976 | Takata et al. |
| 4,427,090 A | 1/1984 | Fredriksen et al. |
| 4,487,286 A | 12/1984 | van der Lely |
| 4,505,356 A | 3/1985 | Baier et al. |
| 4,790,711 A | 12/1988 | Calaway |
| 5,086,869 A | 2/1992 | Newbery et al. |
| 5,664,909 A | 9/1997 | Lindgren et al. |

*Primary Examiner*—Raymond W Addie
(74) *Attorney, Agent, or Firm*—Michael Best & Friedrich LLP (57) ABSTRACT

An operator station is for a compacting vehicle having a frame and at least one compacting drum connected with the frame. The station includes a base plate rotatably connected with the frame and an operator cab slidably connected with the base plate. The cab includes a housing bounding an interior chamber and an operator seat disposed within the chamber. A first actuator is configured to linearly displace the housing with respect to the base plate along a horizontal axis and a second actuator is configured to rotatably displace the base plate about a vertical axis. The cab is linearly displaceable along the horizontal axis between most proximal and most distal positions with respect to the vertical axis and the base plate is rotatably displaceable between a first position where a front wall faces toward a vehicle front and a second position where the front wall faces toward a vehicle side.

17 Claims, 12 Drawing Sheets

MOVABLE OPERATOR STATION FOR VEHICLES

The present invention relates to compactor vehicles, and more specifically to operator stations for compactor vehicles.

Construction vehicles such as compactors typically include an operator station or seat mounted on a main frame of the vehicle. With compactors, an operator is located on the seat or within a cab and directs operation of the vehicle by viewing the edges of the one or more compacting drums of the vehicle. It is thus critical for the operator, to have an unobstructed view of the drum edges in order to guide the vehicle to travel upon a work surface, such as a mat of asphalt.

SUMMARY OF THE INVENTION

In one aspect, the present invention is an operator station for a compacting vehicle having a frame and at least one compacting drum rotatably connected with the frame. The operator station comprises a base plate rotatably connected with the frame and an operator cab slidably connected with the base plate. The cab includes a housing bounding an interior chamber and an operator seat disposed within the housing chamber and configured to support a vehicle operator. Further, an actuator is configured to linearly displace the housing with respect to the base plate.

In another aspect, the present invention is also an operator station for a construction vehicle having a frame. The operator station comprises an operator cab movably connected with the vehicle frame so as to be linearly displaceable with respect to the frame along a generally horizontal axis and rotatably displaceable with respect to the frame about a generally vertical axis. A first actuator is configured to linearly displace the cab along the horizontal axis. Further, a second actuator is configured to rotatably displace the base plate about the vertical axis.

In a further aspect, the present invention is again an operator station for a compacting vehicle having a frame and at least one compacting drum rotatably connected with the frame, the frame having a generally horizontal upper surface. The operator station comprises a base plate disposed on the frame upper surface and movably connected with the frame so as to be rotatably displaceable about a generally vertical axis extending generally perpendicularly with respect to the frame upper surface. An operator cab is slidably connected with the base plate, the cab including a housing bounding an interior chamber and an operator seat disposed within the housing chamber and configured to support a vehicle operator. The cab is linearly displaceable with respect to the base plate along a generally horizontal axis extending generally perpendicular to the vertical axis.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "right", "left", "lower", "upper" designate directions in the drawings to which reference is made. The words "inner", "inwardly" and "outer", "outwardly" refer to directions toward and away from, respectively, a designated centerline or a geometric center of an element being described, the particular meaning being readily apparent from the context of the description. Further, as used herein, the word "connected" is intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1–16 an operator station 10 for a compacting vehicle 1, the vehicle 1 having a frame 2 and at least one compacting drum 3 rotatably connected with the frame 2, the frame 2 preferably having a front end 2a, a rear end 2b, two opposing sides 2c, 2d extending between the ends 2a, 2b, and a generally horizontal upper surface 4. The operator station 10 basically comprises a cab 12 movably connected with the vehicle frame 2 so as to be linearly displaceable with respect to the frame 2 along a generally horizontal axis 13 and rotatably displaceable with respect to the frame 2 about a generally vertical axis 15. The vertical axis 15 extends generally perpendicularly to the frame upper surface 4 and the horizontal axis 13 extends generally parallel with respect to the upper surface 4, the two axes 13, 15 being generally perpendicular to each other. The cab 12 preferably includes a housing 14 bounding an interior chamber $C_1$ and an operator seat 16 disposed within the housing chamber $C_1$ and configured to support a vehicle operator. Preferably, the operator station 10 further comprises a positioning mechanism 11 that includes a base plate 18 rotatably connected with the frame 2, the cab 12 being slidably connected with the base plate 18, a first actuator 20 configured to linearly displace the cab 12 along the horizontal axis 13, and a second actuator 22 configured to rotatably displace the base plate 18, and thereby the cab 12, about the vertical axis 15.

More specifically, the housing 14 has a front end 17, the seat 16 being located with respect to the front end 17 such an operator faces generally toward the front when disposed upon the seat 16. The base plate 18 is rotatably displaceable between a first, front-facing angular position $P_{A1}$ (FIGS. 2, 3 and 12) at which the front end 17 faces generally toward the frame front end 2a and a second, side-facing angular position $P_{A2}$ (FIGS. 1, 4, 5, 14 and 15) at which the housing front end 17 faces generally toward one of the two frame sides 2c or 2d. Preferably, the base plate 18 is further rotatably displaceable between the first angular position $P_{A1}$ and a third, side-facing angular position $P_{A3}$ (FIG. 13), at which the housing front end 17 faces generally toward the other one of the two frame sides 2d or 2c. Further, the cab housing 14 is linearly displaceable generally along the horizontal axis 13 between a first, most proximal axial or "retracted" position $P_{X1}$ with respect to the vertical axis 15 and a second, most distal axial or "extended" position $P_{X2}$ with respect the vertical axis 15. It must be noted that the axial and angular positions are depicted in the drawing figures with respect to a randomly selected point(s) "P" on the station 10 for convenience only and the specific reference points used have no particular relevance to the present invention.

With this structure, when the base plate 18 is disposed in the second, side-facing angular position $P_{A2}$ (FIGS. 1, 4, 5, 14 and 15) or in the third, side-facing angular position $P_{A3}$ (FIG. 13), the housing 14 is displaceable between the first, retracted axial position $P_{X1}$ (FIGS. 4 and 14) and the second, extended axial position $P_{X2}$ (FIGS. 5 and 15) so as to position the seat 16, and thus the operator, in the following manner. In the first, retracted axial position $P_{X1}$ shown in FIGS. 4 and 14, the housing 14 is disposed substantially above the frame upper surface 4, which is particularly suitable for operating the vehicle 1 in narrow confines, etc. In the second, extended axial position $P_{X2}$ depicted in FIGS. 5 and 15, the housing 14 is preferably disposed at least partially over one of the two frame sides 2c or 2d, so as to locate an operator disposed on the seat 16 at a position where the operator has a clear, unobstructed view of the side edges 3a of the one or more drums 3.

Having described the basic elements above, these and other components of the operator station of the present invention are described in detail below.

Referring first to FIGS. 1–5, the operator assembly 10 is preferably used with a double-drum compacting vehicle or compactor 1 having front and rear drums 3 each rotatably attached to the frame 2 and having lateral side edges 3a. Preferably, the frame 2 is an articulated frame having front and rear frame halves 5A, 5B pivotally connected by means of a joint 6. The operator station 10 is preferably mounted on the front frame half 5A, but may alternatively be mounted on the rear frame half 5B, or be used on a solid (i.e., non-articulated) frame 2. Further, the front frame half 5A preferably includes a box-frame portion having an upper, generally horizontal base plate 7, which provides the frame upper surface 4 and to which the operator station 10 is mounted, and an interior chamber (not indicated) within which various components for operating and powering the station 10 and the vehicle 1 are located (e.g., pumps, tanks, hydraulic and electrical lines, etc.).

Although the operator station 10 of the present invention is preferably used with a double-drum compactor 1, the station 10 may be used with a single-drum compactor (not shown) or any other appropriate vehicle 1 that may be benefit from the features of the operator station 10. For example, the vehicle 1 may be another type of construction vehicle, such as for example, a bulldozer or a dump truck, or any other type of vehicle, such as a garbage hauler. The scope of the present invention includes these and all other appropriate types of vehicles 1 for which the operator station 10 may be utilized.

Still referring to FIGS. 1–5, the cab housing 14 is preferably formed as a generally rectangular-shaped box including a generally horizontal bottom wall 24, a generally horizontal top wall 26 spaced above the bottom wall 24, and generally vertical front and rear vertical walls 28, 29, respectively, extending between the top and bottom walls 24, 26. The bottom, top and side walls 24, 26, 28, 29 bound the cab interior chamber $C_1$ space and the seat 16 is generally disposed on or supported by the bottom wall 24. Most preferably, the housing 14 is formed of a plurality of struts or beams 34 forming a generally rectangular skeletal frame 36 and a plurality of panels or plates 38 attached to the skeletal frame 36 and providing the walls 24, 26, 28, and 29. Preferably, at least some of the plates 38 are generally translucent, such as formed of glass or a transparent polymer, so as to provide windows for an operator to view therethrough. However, the housing 14 may be formed in any other appropriate manner that is capable of housing the operator interior chamber $C_1$ and supporting the operator seat 16, such as a weldment formed of plates without a skeletal frame, as a generally cylindrical box (as opposed to generally rectangular), etc.

Referring particularly to FIGS. 1, 2, 4 and 5, the operator seat 16 is preferably fixedly mounted to a central location on the upper surface 24a of the frame bottom wall 24, but may alternatively be pivotally and/or linearly displaceably mounted to the bottom wall 24. The bottom wall 24 preferably has a sloped section 25 disposed forwardly of the seat 16 and providing a foot rest for the vehicle operator. Further, the operator cab 10 preferably further includes a control console (not shown) pivotally mounted to the wall sloped section 25 and configured to support a plurality of vehicle control devices for operating the vehicle 1, such as a steering wheel (not shown) for pivoting the frames 5A, 5B about the joint 6, a drive lever (not shown) for operating the hydraulic motors, etc.

Referring now to FIGS. 3–7 and 10, the positioning mechanism 11 preferably includes a generally rectangular slide plate 44 connected with the housing 14 and having a pair of spaced-apart slide rails 46A, 46B. The slide plate 44 is disposable against and connectable with the lower surface 24b of the housing base wall 24 and is slidably connectable with the base plate 18, as described below. The slide plate 44 preferably has a plurality of through holes 45 each sized to receive a shock assembly 43 contactable with the housing bottom wall 24 to movably (i.e. vertically) connect the housing 14 with the plate 44. Further, each slide rail 46A, 46B is formed as an angled bar 47 having a vertical section 47a attached to the plate lower surface 44a and a horizontal section 47b extending toward the corresponding section 47b of the other bar 47. The two bars 47 extend generally parallel to each other and generally between the front and rear edges 44b, 44c of the plate 44. Furthermore, the slide plate 44 also includes a pair of connective lugs 48 configured to connect a first end 20a of the first actuator 20 with the cab 12, as discussed above and in further detail below.

Referring to FIGS. 3 and 5–9, the base plate 18 of the positioning mechanism 11 preferably includes a platform 50 and a pivot 52 configured to rotatably connect the platform 50 with the vehicle frame 2, more specifically to the base plate 7 on the front frame half 5A. The platform 50 has an upper surface 51, a lower surface 53, and a pair of opposing, outer side edges 50a, 50b. The cab 12 is generally disposed on the platform upper surface 51 through the slide plate 44. That is, the slide plate 44 is disposeable upon the platform upper surface 51 such that each slide rail 46A, 46B engages about and slides generally against a separate one of the platform side edges 50a, 50b, respectively, when the cab 12 displaces with respect to the base plate 18. Specifically, the vertical section 47a of each slide rail 46A, 46B is disposed against a separate platform side edge 50a, 50b and the rail horizontal sections 47b extend beneath the platform lower surface 53. Further, the platform 50 preferably has a generally rectangular slotted opening 54 extending between the upper and lower surfaces 51, 53 and generally from a platform rear edge 50c and toward a front edge 50d. The slotted opening 54 is sized to at least partially receive the preferred first actuator 20. Further, a pair of connective lugs 56 are disposed in a front end 54a of the slotted opening 54, the lugs 56 being configured to connect a second end 20b of the actuator 20 with the platform 50. Preferably, a reinforcing bar 56 extends laterally across the platform lower surface 51 proximal to a rear end 54b of the opening 54 and is provided to increase the structural integrity of the platform 50. Additionally, the platform 50 also preferably has a generally circular opening 58 sized to receive a portion of the pivot 52 to connect the pivot 52 with the base plate 18.

Further, the pivot 52 has a central axis 59 and includes a generally circular tubular body 60 and a generally annular mounting flange 62 connected with the tubular body 60. The tubular body 60 has an upper end 60a disposed within the platform opening 58 and a lower end (not shown) disposeable within a central opening (not shown) of the mounting flange 62. The flange 62 has a plurality of through-holes (not shown) spaced circumferentially about the axis 59 and each sized to receive an upper portion of a threaded fastener (none depicted) for attaching a driven gear 78 of the second actuator 22, as described below, to the pivot 52, and thereby the base plate 18.

Figure 14:
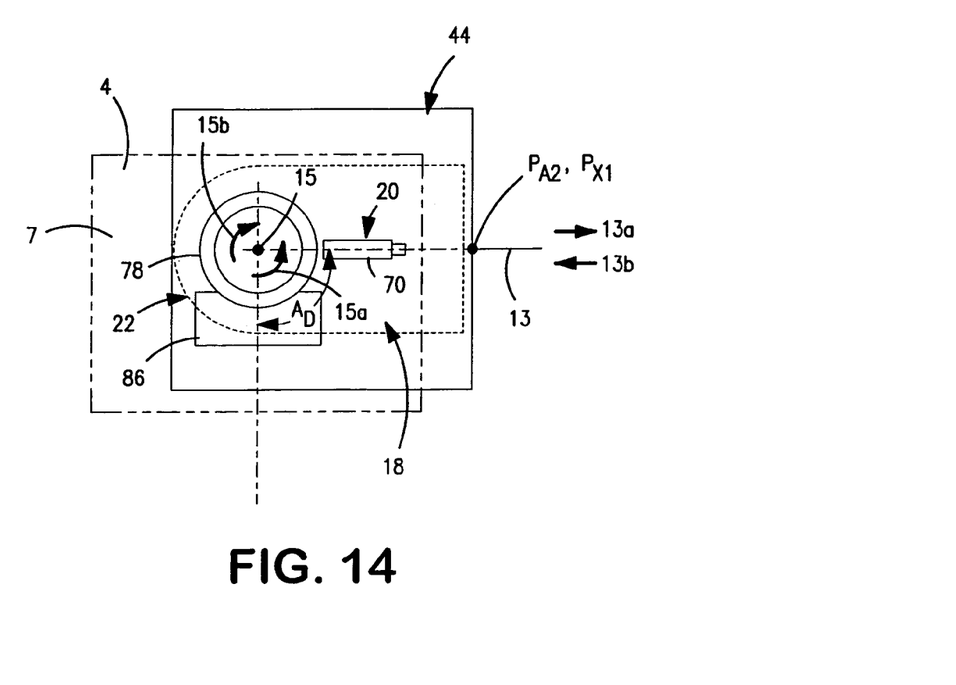
FIG. 14 is another view of the mechanism of FIG. 13, shown in the side-facing and retracted position.
Figure 15:
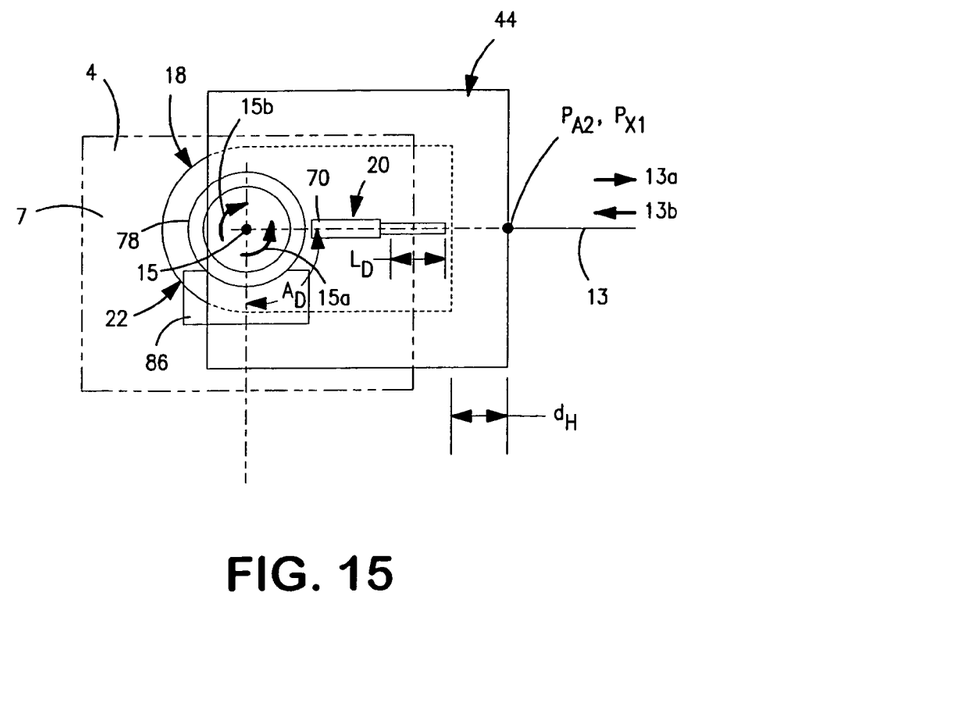
FIG. 15 is another view of the mechanism of FIG. 13, shown in the side-facing and extended position.

Referring to FIGS. 6–9 and 12–15, the first actuator 20 preferably includes a hydraulic cylinder 70 having a first end 70a attached to the platform 50 and a second end 70b connected with the slide plate 44. Specifically, the front and rear ends 70a, 70b are each connected with the platform lugs 56 and the slide plate lugs 48, respectively, by means of a separate pin (neither shown). With this structure, extension of the cylinder 70 causes the slide plate 44 to displace with respect to the base plate platform 50 in a first, outward direction 13a along the horizontal axis 13, thereby moving the cab housing 14 away from the vertical axis 15 and toward the second, distal or extended axial position $P_{X2}$ (FIG. 15). Alternatively, retraction of the cylinder 70 displaces the slide plate 44 and the housing 14 with respect to the base plate 18 in a second, inward direction 13b along the axis 13 toward the vertical axis 15 and the first, proximal or retracted position $P_{X1}$ (FIG. 14). Preferably, the cylinder 70 is extendable and alternatively retractable through a total linear displacement $L_D$ of about ten inches (10"), thus moving the housing 14 through an equivalent displacement $d_H$, although the total displacement of the cylinder 70 and housing 14 may have any appropriate, desired value. Further, the cylinder 70 may be extended by only a portion of the total linear displacement $L_D$, so as to position the slide plate 44 and cab housing 14 at any intermediate position (none indicated) between the retracted and extended positions $P_{X1}$, $P_{X2}$. Although a hydraulic cylinder is preferred, the first actuator 20 may be any other appropriate device capable of linearly displacing the slide plate 44 with respect to the base plate 18, such as for example a power screw assembly, a driven linkage, etc.

Figure 1:
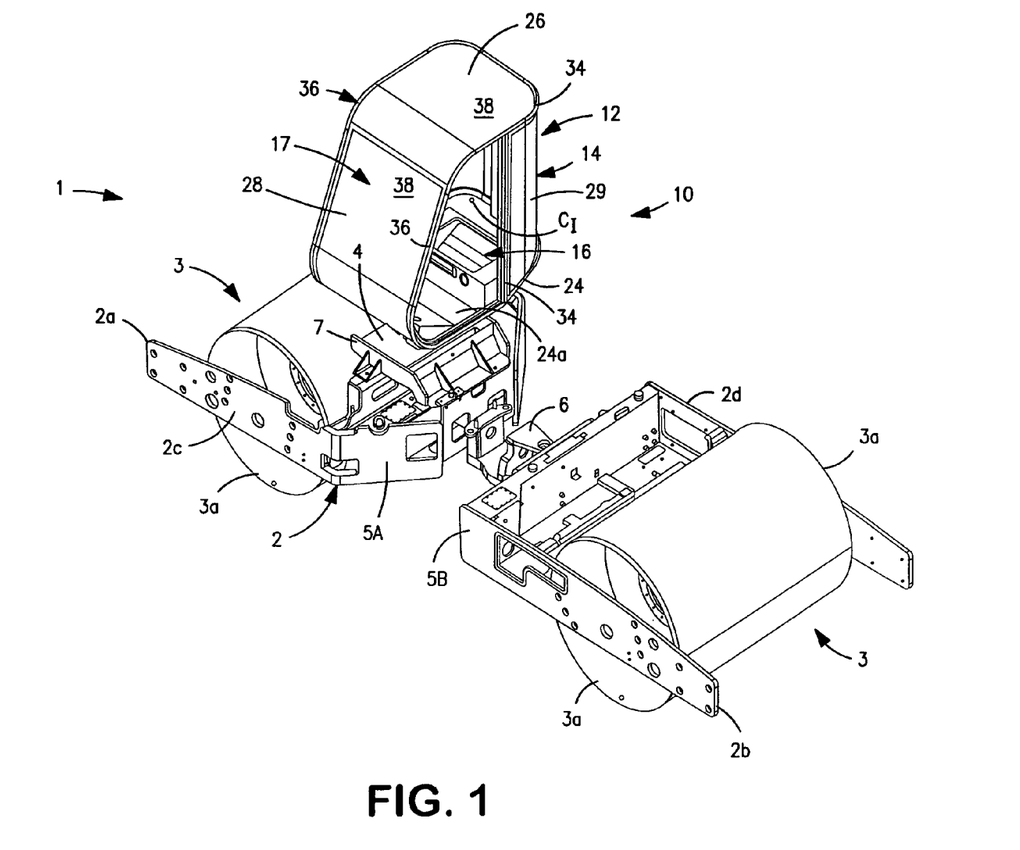
FIG. 1 is a rear perspective view of a compacting vehicle having a movable operator station in accordance with the present invention, the station shown in a side-facing position.
Figure 2:
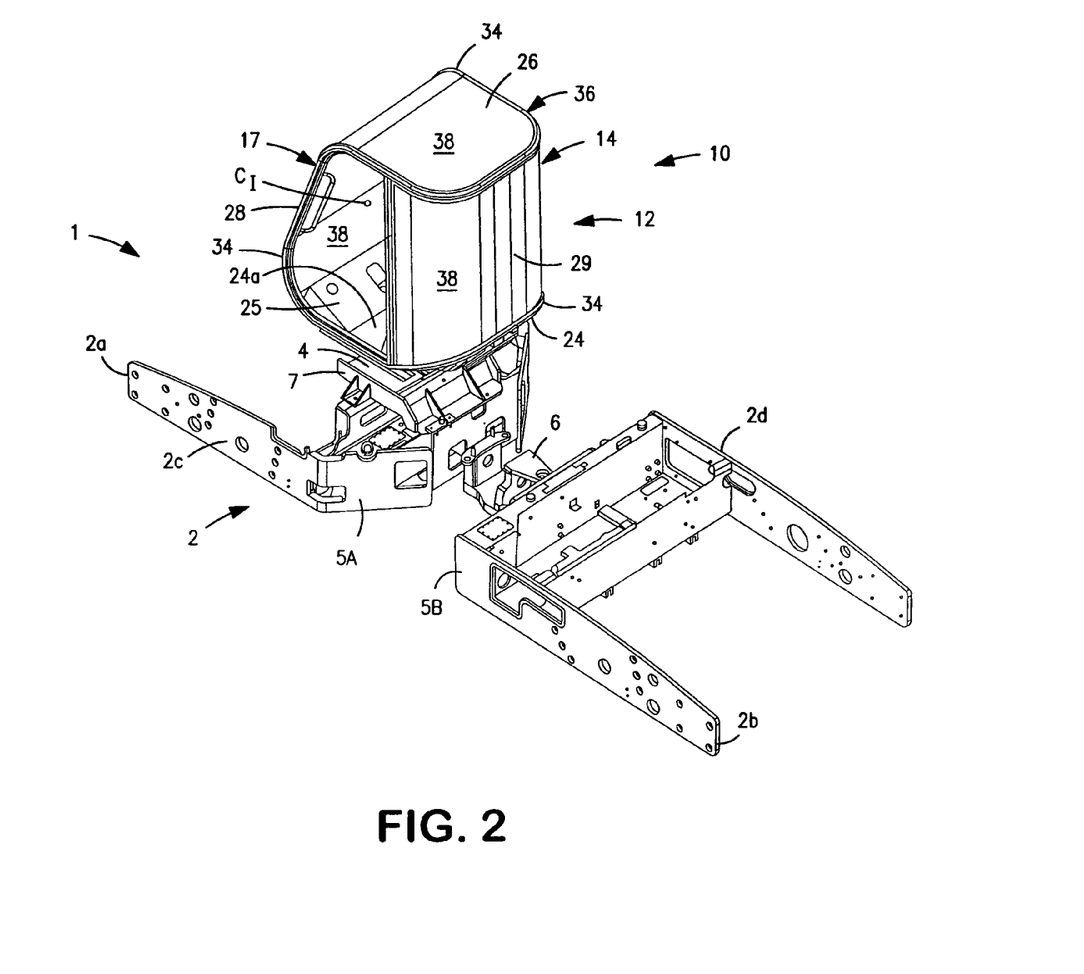
FIG. 2 is another rear perspective view of the compacting vehicle and operator station, the station shown in a front-facing position and the vehicle shown without drums.
Figure 3:
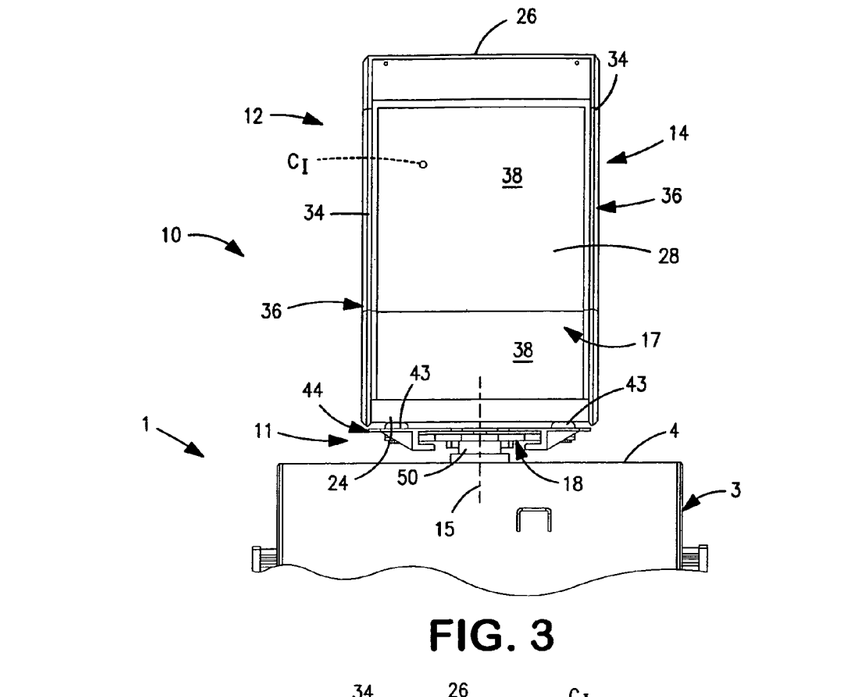
FIG. 3 is a broken-away front elevational position of the vehicle and station, the station shown in the front-facing position.
Figure 4:
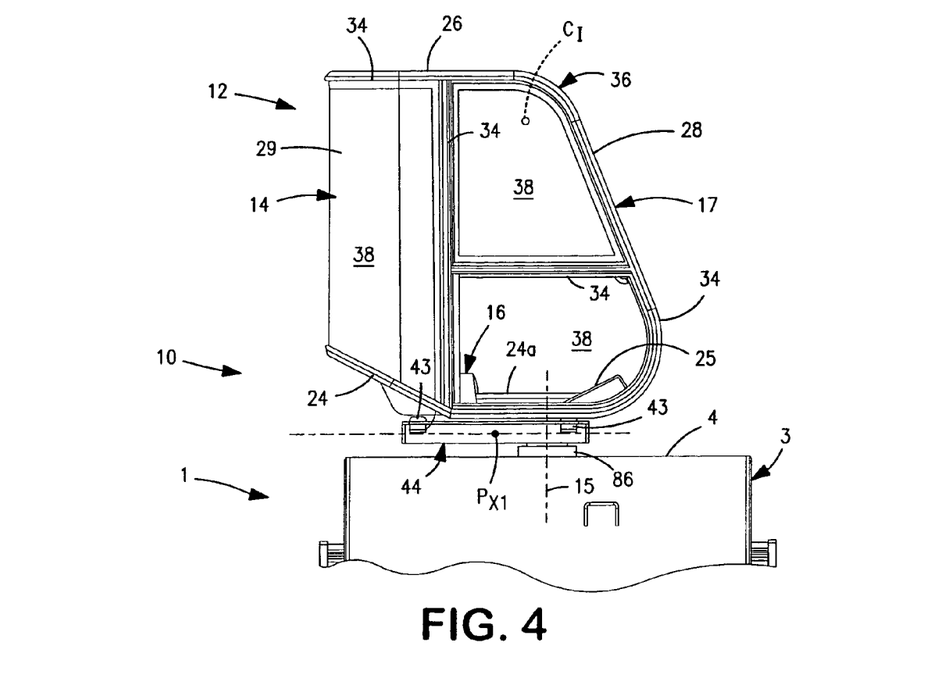
FIG. 4 is a broken-away side elevational position of the vehicle and station, the station shown in the side-facing, retracted position.
Figure 5:
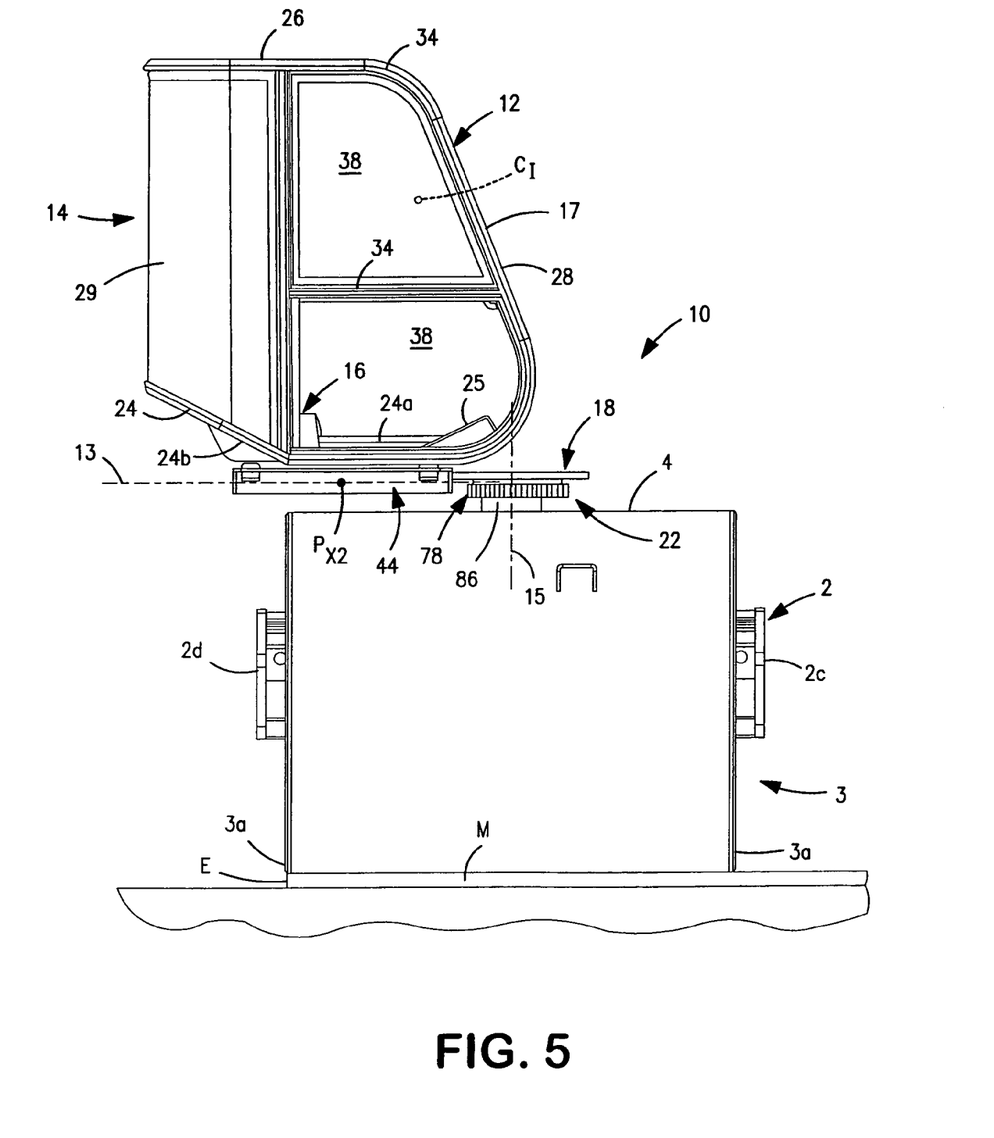
FIG. 5 is a broken-away side elevational position of the vehicle and station, the station shown in the side-facing, extended position.
Figure 6:
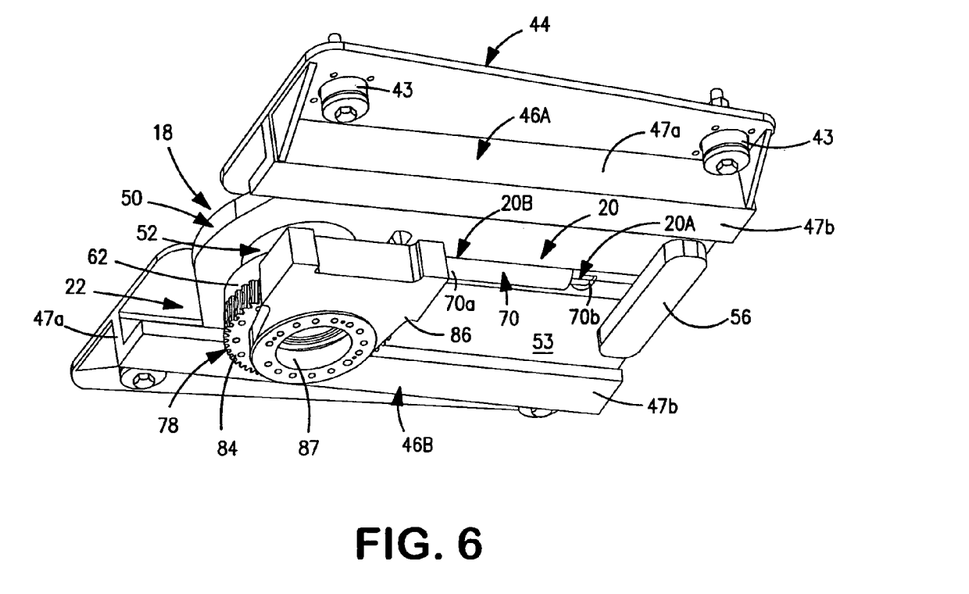
FIG. 6 is a bottom perspective view of a positioning mechanism for displacing the operator station with respect to the vehicle frame, shown in a retracted position.
Figure 7:
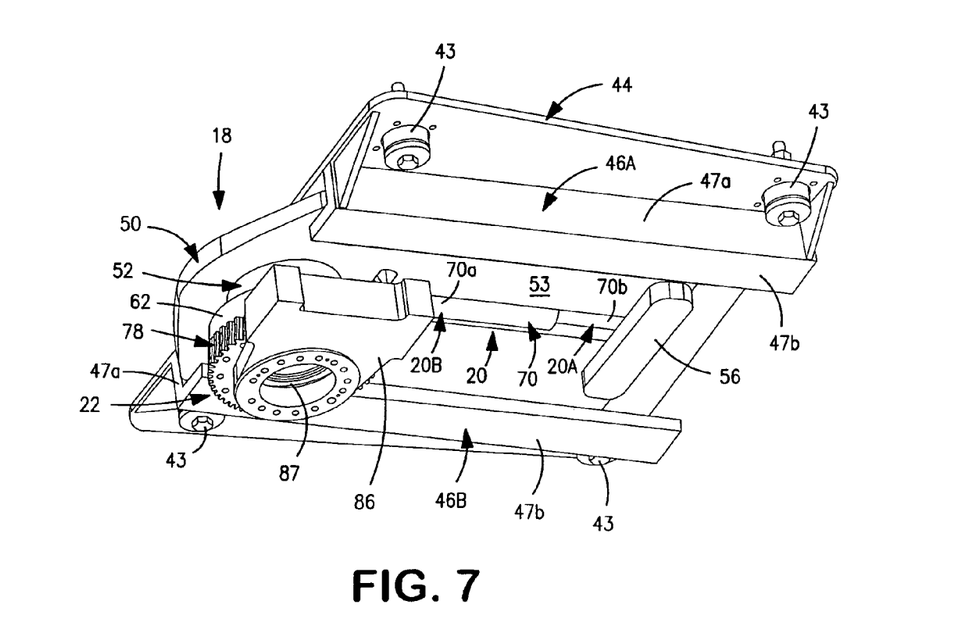
FIG. 7 is a bottom perspective view of a positioning mechanism for displacing the operator station with respect to the vehicle frame, shown in an extended position.
Figure 8:
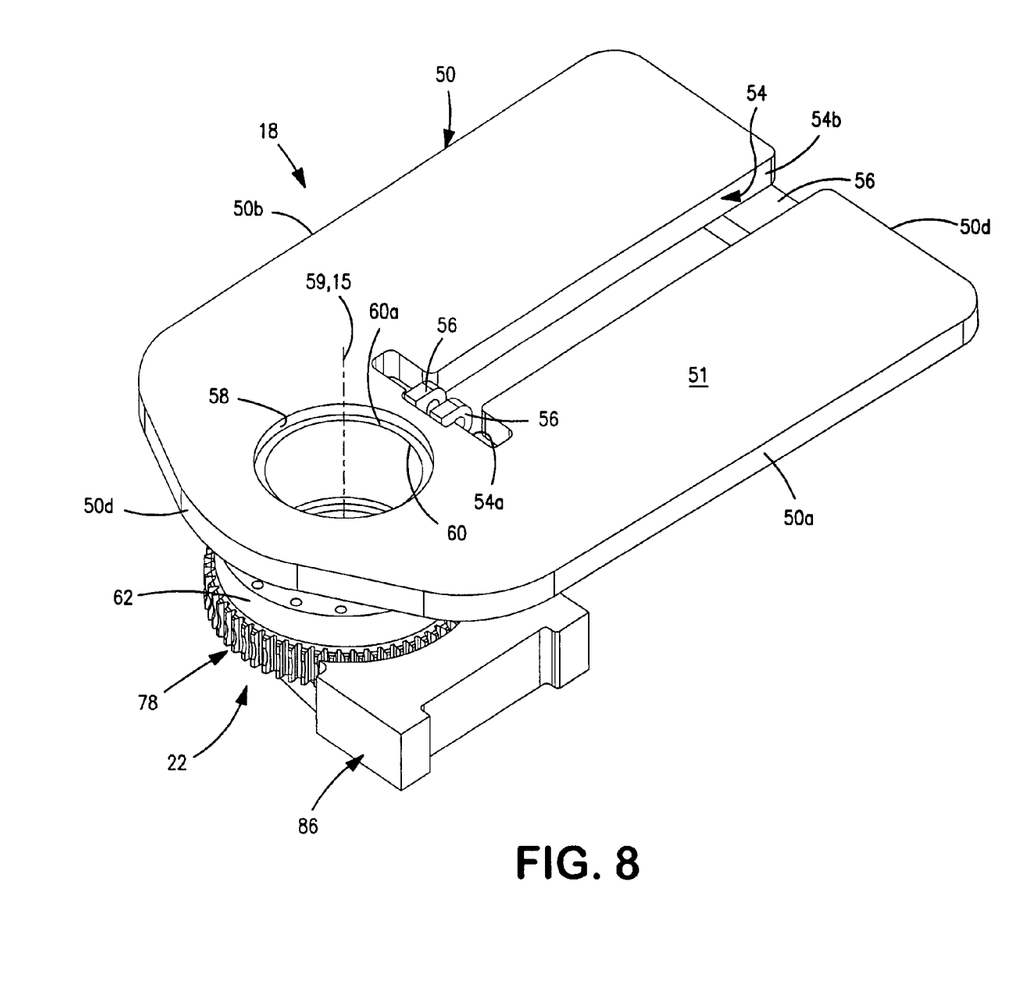
FIG. 8 is a top perspective view of a base plate and a rotation actuator assembly.
Figure 9:
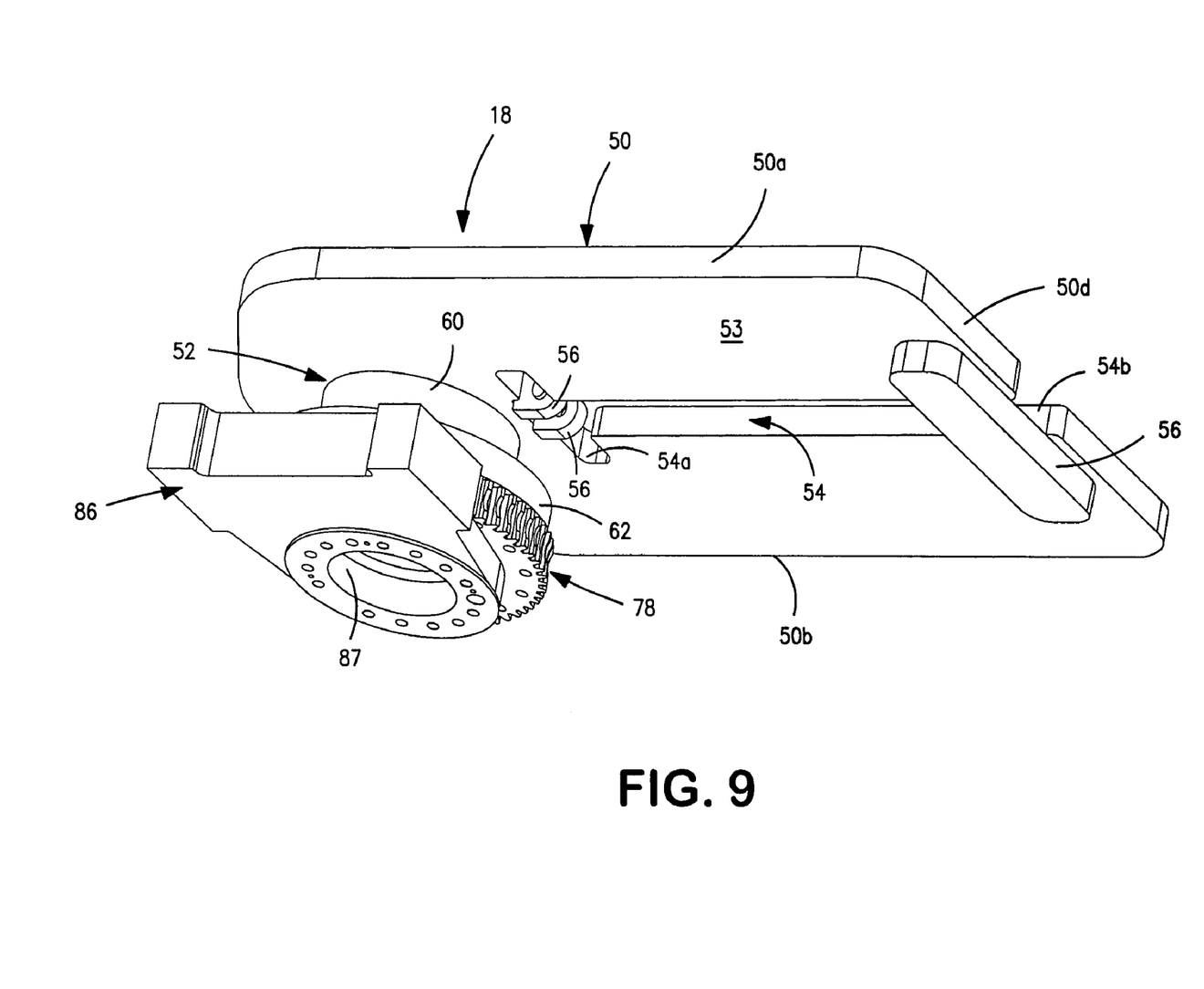
FIG. 9 is a bottom perspective view of the base plate and rotation actuator assembly.
Figure 10:
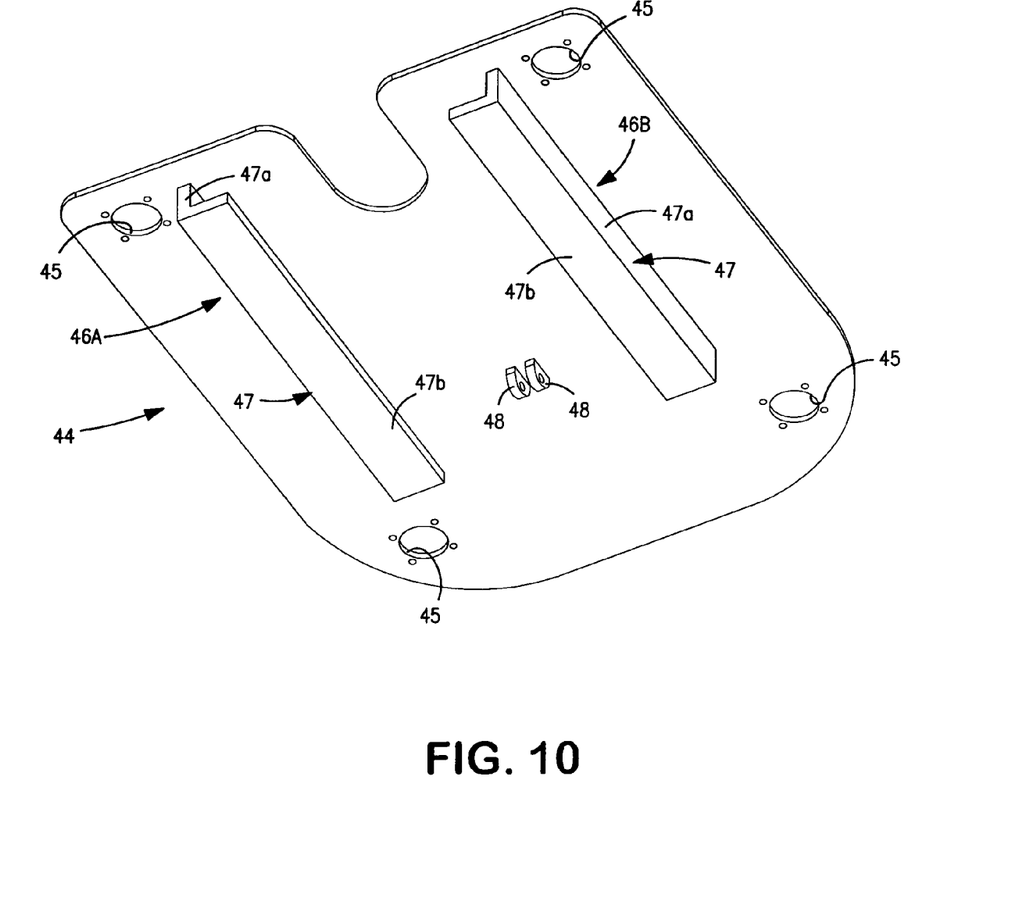
FIG. 10 is a bottom perspective view of a slide plate.
Figure 11:
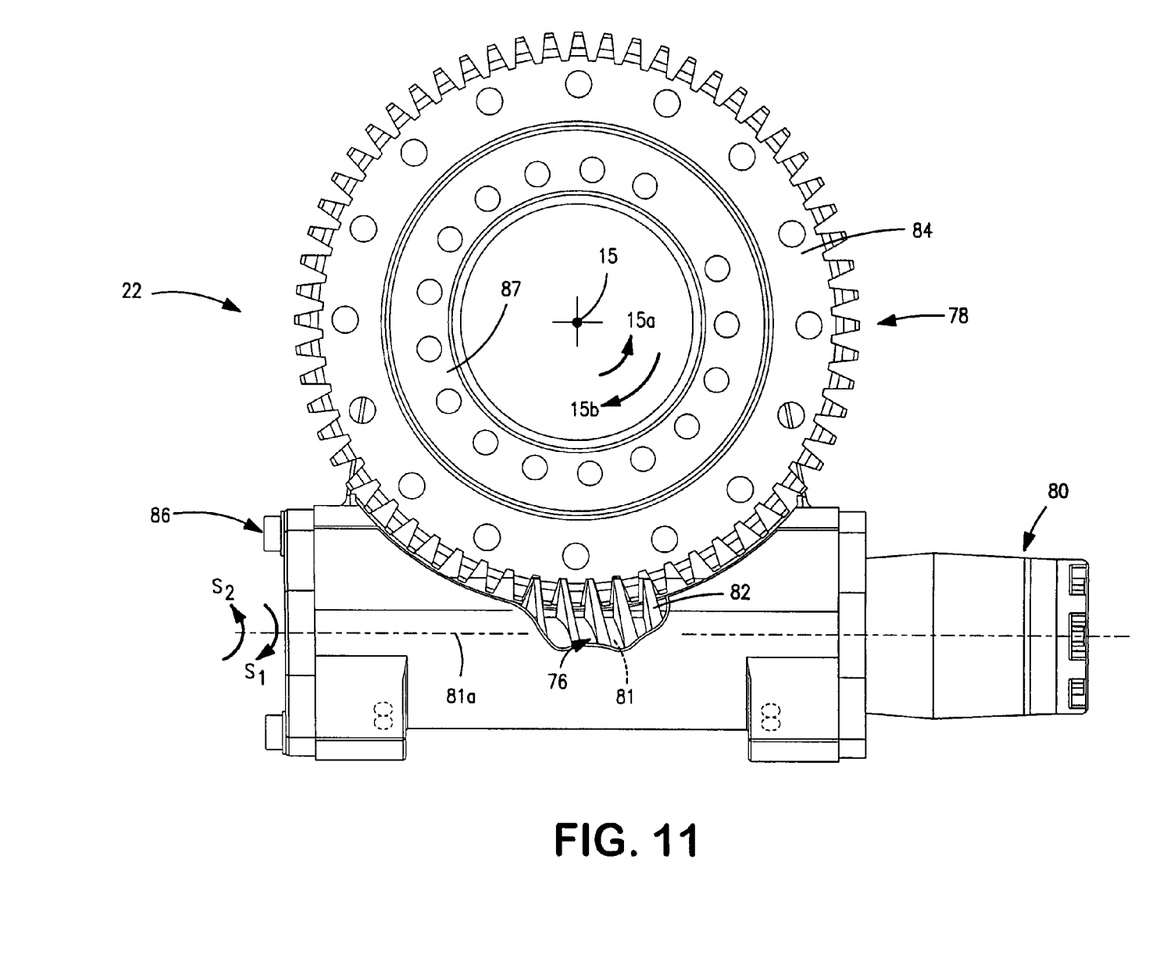
FIG. 11 is a partly broken-away top plan view of the rotation actuator assembly.
Figure 12:
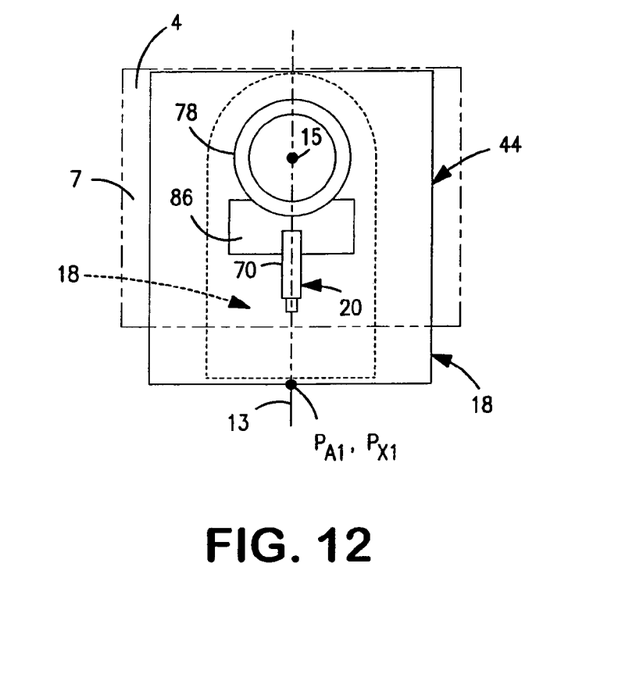
FIG. 12 is more diagrammatic top plan view of the positioning mechanism, shown in front-facing, retracted position.
Figure 13:
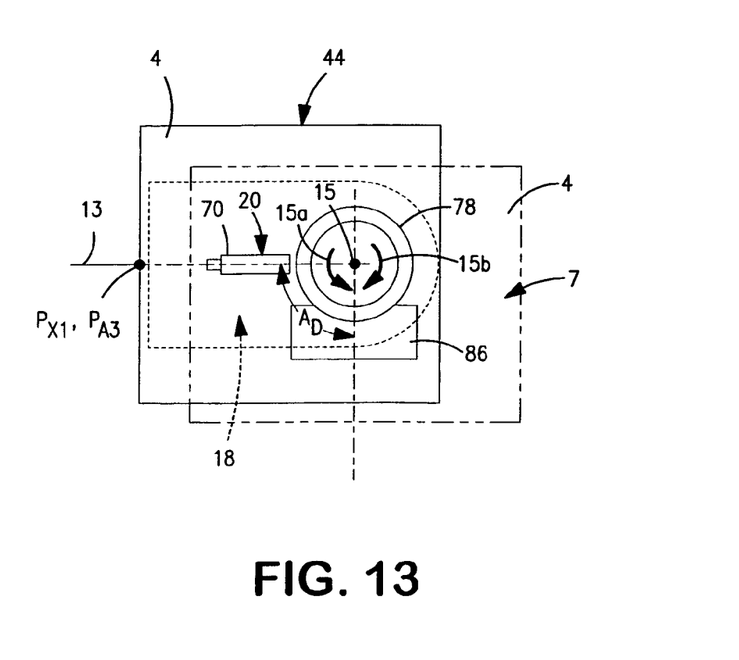
FIG. 13 is another view of the mechanism of FIG. 13, shown in another side-facing and retracted position.

Referring now to FIGS. 5–9 and 11–15, the second actuator 22 preferably includes a drive gear 76 (FIG. 11) connected with the vehicle frame 2, a driven gear 78 connected with the base plate 18 and an engaged with the drive gear 76, and a motor 80 configured to rotate the drive gear 76. As depicted in FIG. 11, the drive gear 76 is preferably an elongated, spiral gear or worm 82 mounted to a shaft (not shown) of the motor 80 that is directly engaged with the driven gear 78. The driven gear 76 is preferably a generally annular worm gear or worm wheel 84 attached to the bearing mounting flange 62, as discussed above. Further, the second actuator 22 preferably also includes a housing 86 mountable to the vehicle frame 2, specifically to the upper plate 7, and sized to contain the drive gear 76 and to support the motor 80. Preferably, the housing 86 further includes an annular bearing post 87 disposed within and configured to rotatably support the worm gear 84. As such, the base plate 18 is rotatably connected with the vehicle frame 2 through the interconnection of the pivot 52, the gear 84 and the housing 86, but may alternatively be directly connected to the frame 2.

With this structure, rotation of the motor shaft 81 in a first direction $S_1$ (FIG. 11) about its axis 81a causes the driven gear 78 to rotate in a first angular direction 15a about the vertical axis 15. Thereby, the base plate 18 and the cab housing 14 are displaced in the first direction 15a generally toward the second angular position $P_{A2}$, and thus also toward the first angular position $P_{A1}$ when starting from the third position $P_{A3}$. Alternatively, rotation of the motor shaft 81 in a second, opposing direction $S_2$ rotates the driven gear 78 in a second angular direction 15b about the axis 15. As such, the base plate 18 and the cab housing 14 are rotatably displaced about the axis 15 in the second 15b direction generally toward the third angular position $P_{A2}$, and also toward the first angular position $P_{A1}$ when starting from the second position $P_{A2}$. Preferably, the second actuator 22 is configured to rotate the housing 14 through an angular displacement $A_D$ of about 90° between each successive angular position $P_{A1}$ and $P_{A2}$, $P_{A1}$ and $P_{A3}$, and thus through a total angular displacement of about 180°. Further, the motor 80 and gears 76, 78 may be operated so as to position the base plate 18 and housing 14 at any desired angular position located between the first and second positions $P_{A1}$, $P_{A2}$ or the first and third positions $P_{A1}$, $P_{A3}$.

Although a motor-driven worm 76 directly driving a worm wheel 78 is presently preferred, the second actuator 22 may have any appropriate structure for rotatably displacing the base plate 18. For example, the second actuator 22 may include one or more intermediate gears (none shown) engaged with the drive gear 76 and/or the driven gear 78, the drive gear 76 may be provided by a spur pinion gear as opposed to a worm gear, the second actuator 22 may include or be primarily comprised of a driven linkage or bar mechanism, etc. The scope of the present invention encompasses these and all appropriate structures for the second actuator 22 that are capable of rotatably displacing the base plate 18 and thereby the cab 12.

Figure 16:
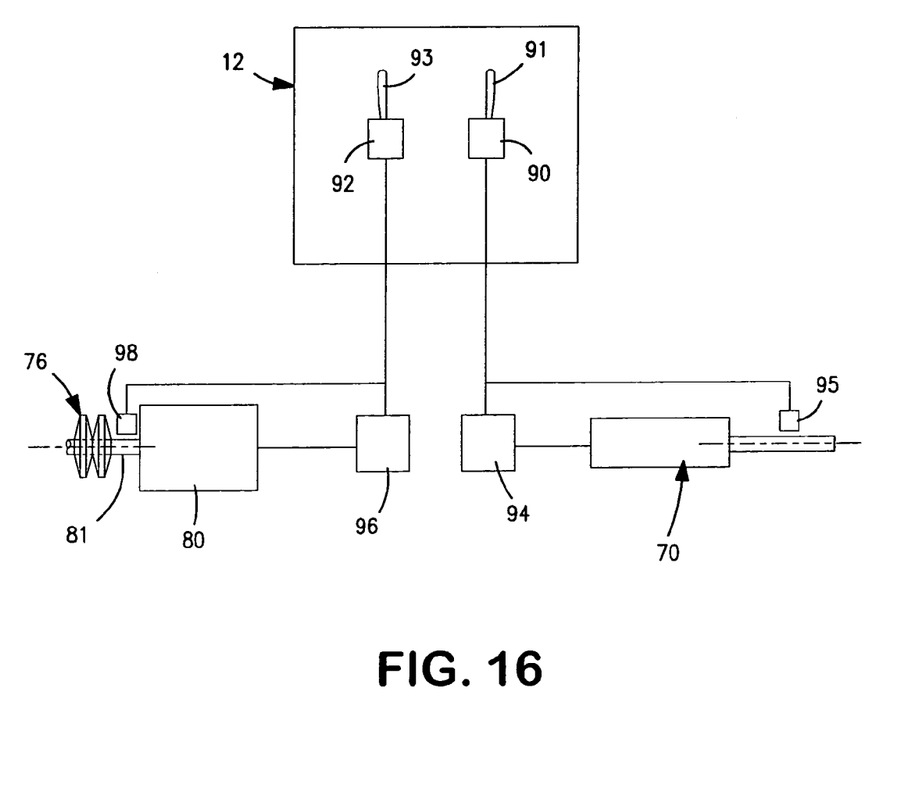
FIG. 16 is a more diagrammatic view of a control system for operating the positioning mechanism.

Referring particularly to FIG. 16, the operator station 10 preferably further includes a first control unit 90 configured to operate the first actuator 20 and a second control unit 92 configured to operate the second actuator 22. Preferably, each control unit 90, 92 has an operator control device 91, 93, respectively, such as a lever, knob, switch, etc., mounted to the control console 40 so as to be located proximal to an operator O disposed on the operator seat 16. Alternatively, a single operator device (not shown) may be provided to control the operation of both the first and second actuators 20, 22, for example an appropriately configured joystick.

The first control unit 90 preferably further includes a control valve 94 operably connected with the first control device 91 and configured to control flow through the preferred hydraulic cylinder 70, and thereby cylinder extension and retraction, to thus locate the cab 12 at any desired position along the horizontal axis 13. Further, the first control unit 90 also preferably includes a linear position sensor 95 configured to sense the specific location of the cab housing 14 on the horizontal axis 13, such as for example, a linear displacement transducer configured to sense the amount of extension or retraction of the cylinder 70 from a reference position.

The second control unit 92 further includes a motor controller 96 operably connected with the second control device 93 and configured to operate the motor 80 so as to position the base plate 18, and thus the cab housing 14, to a desired angular position about the vertical axis 15. Preferably, the second control unit 92 also includes an angular position sensor 96 configured to provide an indication of the specific angular position of the cab housing 14 about the vertical axis 15, such as for example, an encoder sensing the angular displacement of the motor shaft 81 or the bearing 50, etc. Alternatively, the motor 80 may be provided by a stepper motor, such that an angular position sensor may be unnecessary. Furthermore, the two control units 90, 92 may alternatively be provided by a single controller (not shown) having separate channels controlling the control valve 94 and the motor controller 96.

In use, an operator located on the seat 16 positions the cab 12 as desired in generally the following manner. When the vehicle 1 is being driven between work sites or during a work operation in which a view of either drum edge(s) 3a is not essential, the cab housing 14 may be located in the first, retracted axial position $P_{X1}$ proximal to the frame front end 2a and the base plate 18 may be located in the first, front-facing angular position $P_{A1}$, and thus disposed in a generally centered configuration on the frame upper surface 4. However, when the vehicle operator desires to view one of the drum lateral side edges 3a, such as when guiding the compactor drums 3 along the edge E of an asphalt mat M (FIG. 5), the operator station 10 may be repositioned in the following manner. Preferably, the operator first rotates the entire operator station 10 about the vertical axis 15 by operating the motor 80 and gear train 76, 78 so as to angularly displace the base plate 18 from the first, front-facing angular position $P_{A1}$ to either the second, side-facing angular position $P_{A2}$ or the third, side-facing angular position $P_{A3}$, preferably by means of the second control unit 92. Then, the vehicle operator linearly displaces the cab housing 14 by operating the hydraulic cylinder 70, preferably by means of the first control unit 90, such that the slide plate 44 (and thus the housing 14) displaces along the horizontal axis 13 from the proximal, retracted axial position $P_{X1}$ to the distal, extended axial position $P_{X2}$, or to any intermediate axial position (none indicated) located between the proximal and distal positions $P_{X1}$, $P_{X2}$ As such, when the operator station 10 is located in a left or right laterally-extended configuration (FIGS. 5 and 15), the housing 14 is preferably disposed over the proximal frame sides 2a or 2b to provide the operator with a direct view of the proximal drum edge 3a.

When it is desired to move the operator station 10 back to the centered position on the frame 2, the operator first retracts the cylinder 70 to linearly displace the slide plate 44 and housing 14 to the proximal, retracted axial position $P_{X1}$, and then operates the motor 80 to rotatably displace the base plate 18 and cab 12 to the first, front-facing angular position $P_{A1}$. Although it is generally preferred to operate the vehicle 1 with the operator station either in the centered, front-facing configuration (FIGS. 2, 3 and 12) or one of the laterally-extended, side-facing configurations (FIGS. 1, 4, 5 and 13–16), the vehicle 1 may be operated with the housing 14 positioned at any axial location on the horizontal axis 13 between the proximal and distal axial positions $P_{X1}$, $P_{X2}$, and/or at any angular location about the vertical axis 15 between the second and third angular positions $P_{A2}$, $P_{A3}$.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined in the appended claims.

We claim:

1. An operator station for a compacting vehicle, the vehicle having a frame and at least one compacting drum rotatably connected with the frame, the station comprising:
   a base plate rotatably connected with the frame;
   an operator cab slidably connected with the base plate, the cab including a housing bounding an interior chamber and an operator seat disposed within the housing chamber and configured to support a vehicle operator; and
   an actuator configured to linearly displace the housing with respect to the base plate.

2. The operator station as recited in claim 1 wherein the vehicle frame includes a generally horizontal upper surface, the base plate is rotatable about a generally vertical axis extending generally perpendicularly with respect to the frame upper surface and the housing is displaceable with respect to the base plate along a generally horizontal axis extending generally parallel with respect to the frame upper surface.

3. The operator station as recited in claim 2 wherein the housing is displaceable generally along the horizontal axis between a first, most proximal position with respect to the vertical axis and a second, most distal position with respect the vertical axis.

4. The operator station as recited in claim 3 wherein:
   the vehicle frame has a front end, a rear end and two opposing sides;
   the housing has a generally vertical front wall, the seat being located with respect to the front wall such an operator faces generally toward the front wall when disposed upon the seat; and the base plate is rotatably displaceable between a first position at which the front wall faces generally toward the front end and a second position at which the housing front wall faces generally toward one of the two frame sides.

5. The operator station as recited in claim 4 wherein when the base plate is disposed in the plate second position, the housing is displaceable between the first housing position, at which the housing is disposed substantially above the frame upper surface, and the second cab position at which the housing is disposed over one of the two frame sides so as to position an operator disposed on the seat to view the drum.

6. The operator station as recited in claim 4 wherein the base plate is rotatably displaceable between the first position and a third position at which the housing front wall faces generally toward the other one of the two frame sides.

7. The operator station as recited in claim 1 wherein the actuator is a first actuator and further comprising a second actuator configured to rotatably displace the base plate with respect to the vehicle frame.

8. The operator station as recited in claim 7 wherein the first actuator includes a hydraulic cylinder and the second actuator includes a motor.

9. The operator station as recited in claim 8 wherein the second actuator further includes a gear train having a drive gear connected with the motor and a driven gear operably connected with the drive gear and connected with the base plate, such that rotation of the motor rotates the base plate.

10. The operator station as recited in claim 1 wherein the base plate includes:

a platform having an upper surface and a lower surface, the cab being generally disposed on the platform upper surface;

bearing connected with the platform so as to extend from the platform lower surface and configured to rotatably connect the platform with the vehicle frame.

11. The operator station as recited in claim 10 wherein the platform further has a pair of opposing, outer side edges and the cab further includes a slide plate connected with the housing and having a pair of slide rails, the slide plate being disposeable upon the platform upper surface such that each slide rail slides generally against a separate one the of the platform side edges when the cab displaces with respect to the base plate.

12. The operator station as recited in claim 10 wherein the actuator includes a hydraulic cylinder having a first end attached to the platform and a second end connected with the slide plate.

13. The operator station as recited in claim 10 further comprising a drive gear connected with the vehicle frame and a driven gear connected with the bearing and engaged with the drive gear such that rotation of the drive gear rotatably displaces the platform with respect to the vehicle frame.

14. The operator station as recited in claim 13 further comprising a motor configured to rotate the drive gear.

15. The operator station as recited in claim 1 wherein the cab housing includes a frame having a generally horizontal bottom wall, a generally horizontal top wall spaced above the bottom wall and at least one generally vertical side wall extending between the top and bottom walls, the bottom, top and side walls bounding the cab interior space and the seat being disposed on the bottom wall.

16. The operator station as recited in claim 1 wherein the cab further includes a plurality of vehicle control devices disposed within the housing interior space.

17. An operator station for a compacting vehicle, the vehicle having a frame and at least one compacting drum rotatably connected with the frame, the frame having a generally horizontal upper surface, the station comprising:

a base plate disposed on the frame upper surface and movably connected with the frame so as to be rotatably displaceable about a generally vertical axis extending generally perpendicularly with respect to the frame upper surface;

an operator cab slidably connected with the base plate, the cab including a housing bounding an interior chamber and an operator seat disposed within the housing chamber and configured to support a vehicle operator, the cab being linearly displaceable with respect to the base plate along a generally horizontal axis extending generally perpendicular to the vertical axis.

\* \* \* \* \*